United States Patent [19]

Gupta

[11] Patent Number: 4,644,077
[45] Date of Patent: Feb. 17, 1987

[54] PROCESS FOR PRODUCING ORGANOPHILIC SILICA

[75] Inventor: Goutam Gupta, Homewood, Ill.

[73] Assignee: The Sherwin-Williams Company, Cleveland, Ohio

[21] Appl. No.: 777,461

[22] Filed: Sep. 18, 1985

Related U.S. Application Data

[63] Continuation of Ser. No. 629,644, Jul. 11, 1984, abandoned.

[51] Int. Cl.$^4$ .............................. C07F 7/08; C07F 7/18
[52] U.S. Cl. ........................................ 556/457; 556/400; 556/458
[58] Field of Search .................... 556/457, 400, 458

[56] References Cited

U.S. PATENT DOCUMENTS

| | | | |
|---|---|---|---|
| 2,408,654 | 10/1946 | Kirk | 556/400 X |
| 2,657,149 | 10/1953 | Iler | 556/457 X |
| 2,680,696 | 6/1954 | Broge | 556/457 X |
| 3,751,326 | 8/1973 | Marks | 161/5 |
| 3,986,997 | 10/1976 | Clark | 260/29.2 |
| 4,027,073 | 5/1977 | Clark | 428/412 |
| 4,041,120 | 8/1977 | Oshima et al. | 264/171 |
| 4,073,967 | 2/1978 | Sandvig | 427/44 |
| 4,125,703 | 11/1978 | Blount | 556/457 X |
| 4,135,007 | 1/1979 | Lorenz et al. | 427/44 |
| 4,159,206 | 6/1979 | Armbruster et al. | 106/287.12 |
| 4,164,509 | 8/1979 | Laufer | 556/400 |
| 4,177,315 | 12/1979 | Ubersax | 428/336 |
| 4,188,451 | 2/1980 | Humphrey, Jr. | 428/331 |
| 4,191,804 | 3/1980 | Weber | 428/409 |
| 4,198,465 | 4/1980 | Moore et al. | 428/409 |
| 4,199,421 | 4/1980 | Kamada et al. | 204/159.22 |
| 4,216,024 | 8/1980 | Ivanchev et al. | 556/400 X |
| 4,225,631 | 9/1980 | Berger et al. | 427/54.1 |
| 4,227,979 | 10/1980 | Humke et al. | 204/159.16 |
| 4,262,072 | 4/1981 | Wendling et al. | 430/14 |
| 4,275,118 | 6/1981 | Barney et al. | 428/412 |
| 4,277,287 | 7/1981 | Frye | 106/287.12 |
| 4,299,746 | 11/1981 | Frye | 260/29.2 |
| 4,319,811 | 3/1982 | Tu et al. | 351/166 |
| 4,348,462 | 9/1982 | Chung | 428/412 |
| 4,390,373 | 6/1983 | White et al. | 106/287.12 |
| 4,474,704 | 10/1984 | Sawicki | 556/400 X |

FOREIGN PATENT DOCUMENTS

WO82/02403  7/1982  PCT Int'l Appl.

OTHER PUBLICATIONS

*Surface and Colloid Science*, vol. 6, 1973, Egon Matijevic, pp. 74–79.
Chem Abstracts, 97:57221e, Inagaki et al.
Chem Abstracts, 90:105220h, Arakawa et al.
Chem Abstracts, 92:23635z, Suzuki et al.

Primary Examiner—Paul F. Shaver
Attorney, Agent, or Firm—Robert E. McDonald; James V. Tura

[57] ABSTRACT

In a silica organosol consisting of silica dispersed in a water-miscible organic solvent, a process for treating the silica with a trialkoxysilane to make the silica more organophilic while minimizing the self condensation of the trialkoxy silane, which process comprises:

(a) admixing water and a catalytic amount of acid to the silica organosol; and
(b) gradually adding a trialkoxysilane to the admixture under reactive conditions; and
(c) removing substantially all of the water;

wherein the trialkoxy silane is present at a level up to about 30% by weight based upon the weight of the silica and the water is added at an amount up to about 30% by weight based upon the weight of the water-miscible organic solvent.

9 Claims, No Drawings

PROCESS FOR PRODUCING ORGANOPHILIC SILICA

This application is a continuation of U.S. Ser. No. 629,644, filed July 11, 1984, now abandoned.

BACKGROUND OF THE INVENTION

1. Field of the Invention

This invention relates to a process for treating a silica organosol to make the silica more organophilic by reacting the silica with a trialkoxysilane while minimizing the self-condensation of the trialkoxysilane. Silica particles treated in this manner show excellent compatibility with organic solvents, monomers and polymers, and provide a more effective usage of the silane surface treating materials.

2. Description of the Prior Art

Numerous methods of treating silica particles to make them more organophilic are known in the prior art. The prior art teachings which involve the reaction of silica and a trialkoxysilane typically involve either the prehydrolysis of the trialkoxysilane by mixing the trialkoxysilane with water and optionally acid followed by addition to a silica aquasol, or they involve the reaction of the silica aquasol and the trialkoxysilane in the presence of a major amount of water. For example, International Patent Application WO No. 82/02403 teaches the treatment of silica with a trimethoxysilane by the precondensation of the trimethoxysilane in the presence of water and dilute acid prior to admixing with the silica. U.S. Pat. No. 4,188,451 teaches the generation of surface treated silicas by the addition of the corresponding trialkoxysilane to aqueous dispersions of colloidal silica allowing only minor amounts of water-miscible polar solvents. U.S. Pat. No. 4,177,315 teaches the addition of alkyl trimethoxysilanes to an acidified aqueous dispersion of colloidal silica. U.S. Pat. No. 4,027,073 teaches the preparation of surface treated silicas by the addition of trialkoxysilanes to colloidal silica hydrosols.

These prior art methods have several limitations. The self condensation of the trialkoxysilanes results in less efficient use of the silane surface treating agents since much of the silane merely reacts with other silane materials rather than with the silica surface. In addition to requiring the use of high levels of costly materials this extensive self-condensation can result in less than optimum stability in organic solvents. Furthermore, the use of a major amount of water as the solvent for the reaction raises additional difficulties. The excess water typically must be removed prior to mixing the organophilic treated silica with organic materials. Additional time and expense is involved in removing the excess water. Furthermore, removing the water may cause the silica particles, even after they are surface treated, to agglomerate since the sol converts from an aquasol to an organosol in the process.

Additionally, processes which promote self-condensation of the silane, or which use higher levels of silane create an extensive network of the surface treatment on the particles. This can lead to high intrinsic viscosities of the sols which makes them less suitable for applications such as high solid inks or coatings which have very little solvent but still require low application viscosities.

The process taught in this invention overcomes these limits of the prior art by surface treating a silica which is already dispersed in an organic solvent as a silica organosol by utilizing a minor amount of water with respect to the water-miscible organic solvent and by gradually adding the silane to the admixture of water, a catalytic amount of acid and the silica organosol thereby minimizing the self condensation of the silane.

In the prior art methods the untreated silica particles as well as the particles when treated with the self-condensation product of the silane are particularly stabilized by the water solvent. When the water is removed, however, this stability is lost and the particles may agglomerate. The method of the present invention uses a water-miscible organic solvent and thereby limits the amount of water present during the reaction of the silica and the silane.

Although it is not our intent to be bound by theory, it is believed that the low level of water involved in this improved process is not in a sufficient amount to act as a solvent producing an aquasol. Since the sol is not converted to or from an aquasol in this improved process more stable organosols are produced.

The process of the present invention provides a more narrow particle size distribution of the treated particles, minimizes the agglomeration of the particles, involves the removal of less water from the reaction mixture, makes more efficient use of the silane treating agents and provides silica particles with improved stability in organic materials.

SUMMARY OF THE INVENTION

This invention involves a method of surface treating silica which is dispersed in a water-miscible organic solvent as a silica organosol to make the silica more organophilic by reacting the silica with a trialkoxysilane while minimizing the self condensation of the silane material. This process comprises:

(a) admixing water and a catalytic amount of acid with the silica organosol; and
(b) gradually adding a trialkoxysilane to the admixture under reactive conditions; and
(c) removing substantially all of the water;

wherein the trialkoxysilane is present at a level up to about 30% by weight based upon the weight of the silica and the water is present in an amount up to about 15% by weight based upon the weight of the water-miscible organic solvent.

Accordingly, it is one object of the present invention to provide a novel process for surface treating silicas. Another object of this invention is to provide a process for surface treating silica dispersed in a water-miscible organic solvent as a silica organosol. Another object of this invention is to provide a process for producing surface treated silica by reaction of the silica with a trialkoxysilane which minimizes the selfcondensation of the trialkoxysilane materials. Another object of this invention is to provide a process for surface treating silicas with trialkoxysilanes to provide improved utilization of the trialkoxysilane surface treating materials. An additional object of this invention is to provide a process for surface treating silica by the reaction of silica and a trialkoxysilane while conducting the surface treatment in the presence of a major amount of an organic solvent and a minor amount of water. A more limited object is to produce surface treated silica particles which may provide less intrinsic viscosity and less tendency to gel when dispersed in organic materials.

These and other objects of this invention will be apparent from the detailed description which follows.

DETAILED DESCRIPTION OF THE INVENTION

The process of treating silicas taught herein involves the treatment of silica dispersed in a water-miscible organic solvent as a silica organosol. Methods of producing silica organosols are well known in the art and silica organosols are commercially available. One convenient method for preparing silica organosols from silica aquasols is the method generally taught in Canadian Patent No. 954,765 which involves (i) adding a deionized silica aquasol to a water-miscible organic alcohol; (ii) adding additional alcohol as a water-alcohol azeotrope is removed by distillation; and (iii) recovering the silica organosol product.

The water-miscible solvents which are useful in the preparation of silica organosols in this invention include, preferrably, alcohols such as butyl alcohol, isopropyl alcohol, octyl alcohol, 2-methoxypropanol, 2-methoxyethanol, 2-ethoxyethanol, 1-butoxy-ethoxy-2-propanol, 2-butoxyethoxyethanol, 2-ethoxyethoxyethanol, etc.

The process of this invention can be used to treat any of the types of silicas such as amorphous, crystalline, microcrystalline, precipitated and pyrogenic silicas, however, it is especially useful in treating colloidal silicas, since the process of this invention helps minimize the agglomeration of the silica particles upon surface treatment and subsequent removal of the water and thereby maintains the colloidal particle size.

The trialkoxysilanes which are useful in the practice of this invention are well known in the art and have the typical structure: $RSi(OR_1)_3$; wherein the group R will be an aliphatic or aryl organic radical typically of 1 to about 20 carbon atoms such as n-butyl, n-hexyl, n-heptyl, n-octyl, t-butyl, 3-butenyl, phenyl, etc. The R group can also contain functional groups or hetero atoms such as N or S, and might contain such functional groups as epoxy, acrylate or methacrylate functionality. Typically the group $R_1$ will be lower alkyl, e.g. an alkyl radical containing from 1 to about 7 carbon atoms such as methyl, ethyl, propyl, butyl, isobutyl, amyl, etc. Representative examples of the trialkoxysilanes include methyltrimethoxysilane, propyltriethoxysilane, methyltriisopropoxysilane, gamma chloropropyltrimethoxysilane, 3-acryloxypropyltrimethoxysilane, 2-methacryloxyethyltrimethoxysilane, 2-acryloxyethyltrimethoxysilane, 3-methacryloxypropyltriethoxysilane, 2-methacryloxyethyltriethoxysilane, 2-acryloxyethyltriethoxysilane, gamma glycidoxypropyltrimethoxysilane, gamma methacryloxypropyltrimethoxysilane, gamma glycydoxypropyltriethoxysilane, beta glycydoxyethyltrimethoxysilane, 3,3,3-trifluoropropyltrimethoxysilane, 3,4-epoxycyclohexyl-ethyltriethoxysilane, phenyltrimethoxysilane, vinyltriethoxysilane, vinyltrimethoxyethoxysilane, vinyltris(betamethoxyethoxy)silane, N-beta(aminoethyl) gamma aminopropyltrimethoxysilane, gamma mercaptopropyltrimethoxysilane, beta cyanoethyltriethoxysilane, etc. Dialkoxysilanes and monoalkoxysilanes could also be used as partial or total replacements for the trialkoxysilanes but they are not preferred due to their lower reactivity.

The first step in the process of this invention involves admixing water and a catalytic amount of acid with the organosol. The water should be present in an amount ranging up to about 15% by weight based upon the weight of the water-miscible organic solvent. Typically, the water will range from about 1 to about 10% by weight based on the weight of the water-miscible organic solvent. By maintaining a major amount of the water-miscible organic solvent and a minor amount of water as the silica sol medium, the silica is not converted to a silica aquasol, and this allows for more efficient usage of the silane and minimizes agglomeration of the silica particles upon removal of the water.

The acid should be present in a catalytic amount, typically at least 0.01% by weight based upon the weight of the trialkoxysilane and it is generally preferred to add a sufficient amount of acid to reduce the pH to a level below 7.0 or lower. It is frequently desirable to add a sufficient amount of acid to maintain the reaction at a pH of about 3.0 to 6.0 to provide the best rate of reaction. Any acid including inorganic acids such as nitric, sulfuric, hydrochloric or organic acids such as acetic, oxalic, benzoic, etc. can be used.

The second step of the process of this invention involves the gradual addition of the trialkoxysilane to the admixture of water, acid and silica organosol under reactive conditions. If desired, more than one trialkoxysilane can be used as a mixture for the surface treatment. The trialkoxysilane should be added at a level up to about 30% by weight based upon the weight of the silica, and will typically be utilized at a level between about 1 to about 20% and preferrably from 5 to about 12% by weight. The reaction should be maintained at reactive conditions between about 25° C. and about 140° C., and it is especially preferred to maintain the admixture under reactive conditions of about 90° to 130° C. By gradual addition is meant that the trialkoxysilane should be added slowly to the admixture to insure that there is always an excess of silanol groups available on the surface of the silica particles compared to those produced by the hydrolysis of the trialkoxysilanes. The rate of gradual addition will depend upon the size of the reaction vessel the reaction temperature, and the efficiency of mixing, but as a general guideline, the trialkoxysilane should be added over a period of at least one hour and preferrably over a period of from 2 to about 10 hours.

If the trialkoxysilane is a liquid material it can be conveniently added in its liquid state or diluted with a suitable solvent. Trialkoxysilanes which are solids at room temperature can be added in their solid form or conveniently dissolved in a suitable organic solvent, preferrably in water-miscible solvent such as a lower alkyl alcohol and then added as a solvent solution.

The final step in the process of this invention involves removing the water from the surface treated silica organosol. If the reaction between the trialkoxysilane and the silica is conducted at sufficiently high temperatures, e.g. above about 90° C., the water will be gradually removed by evaporation during the addition of the trialkoxysilane. Frequently, the water-miscible organic solvent present in the silica organosol will combine with the water to produce an azeotrope which is readily removed from the reaction mixture by evaporation. It is especially preferred to use a lower alkyl alcohol such as ethanol or propanol for this purpose. If desired, the remaining water can be conveniently removed by distillation at elevated temperatures and/or reduced pressures. As mentioned, depending upon the reaction temperature, the water may be gradually removed during the process of the reaction of the silane with the silica, or, if desired substantially all of the water remaining after the reaction is complete can be removed by azeotropic distillation.

The combination of maintaining a major amount of a water-miscible organic solvent and a minor amount of water as the silica sol medium and the gradual addition of the trialkoxysilane minimizes the self-condensation of the trialkoxysilane and produces a stable silica organosol with essentially no tendency to agglomerate into larger silica particles.

The surface treated silicas of this invention can be conveniently utilized in combination with any organic materials such as organic solvents, organic monomers, organic polymers such as vehicles for inks and coatings, or other uses.

As used herein, unless otherwise stated, the term "parts" means parts by weight.

EXAMPLE I

A reaction vessel equipped with a condenser, thermometer, stirrer, and addition funnels was charged with 135.96 parts Nalco 2SS 374 (35% colloidal silica in 2-ethoxyethanol available from Nalco Chemical Company), 1.1 parts acetic acid and 4.76 parts water. The mixture was stirred and heated to 120° C. 4.55 parts gamma methacryloxypropyltrimethoxysilane and 68.15 parts ethanol were premixed and then added to the hot silica suspension over a period of about 6 hours. During the course of the addition, a continuous distillate of ethanol-2-ethoxyethanol-water (104 parts total) was collected through the condenser as the temperature was maintained between about 108° to 120° C. After the addition was completed the mixture was held at 120° C. for 30 minutes and then cooled to yield the surface treated silica. The surface treated silica had excellent compatibility with organic monomers and maintained its colloidal properties.

EXAMPLE II

A surface treated silica can be prepared in the manner described in Example I but replacing the 4.55 parts gamma methacryloxypropyltrimethoxysilane with 2.0 parts phenyltrimethoxysilane and 1.5 parts 3,3,3-trifluoropropyltrimethoxysilane. Silicas surface treated in this manner can be readily dispersed in organic solvents, monomers or polymers.

EXAMPLE III

A reaction vessel equipped with a stirrer, condenser, thermometer and addition funnel was charged with 299.5 parts Nalco 2SS 374, 2.4 parts acetic acid and 10.5 parts deionized water. The mixture was stirred and slowly heated to 120° C. 10.0 parts isobutyltrimethoxysilane dissolved in 150.0 parts ethanol was added to the hot silica suspension over a period of two hours. After the addition was completed, the mixture was held at 118°-20° for 15 minutes during which time the distillation of the water-alcohol mixture ceased. During the course of the silane addition and the additional hold time, 55.5 parts of a water-2-ethoxyethanol-ethanol mixture was collected by distillation. After the hold period, the mixture was cooled to produce the surface treated silica organosol. The treated silica sol had excellent compatibility with organic solvents and monomers and maintained its colloidal properties.

EXAMPLE IV

A surface treated silica sample was prepared in the manner described in Example III, but replacing the 10 parts of isobutyltrimethoxysilane by 11.5 parts octyltriethoxysilane. The treated silica was compatible with organic solvents and monomers while maintaining colloidal properties.

EXAMPLE V

A surface treated silica sample was prepared in the manner described in Example III, but replacing the 10 parts of isobutyl trimethoxysilane with 10 parts of octadecyl triethoxysilane. The treated silica was compatible with organic solvents and monomers while maintaining colloidal properties.

While this invention has been described by a specific number of embodiments, it is obvious that other variations and modifications may be made without departing from the spirit and scope of the invention as set forth in the appended claims.

The invention claimed is:

1. In a silica organosol consisting of silica dispersed in a water-miscible organic solvent, a process for treating the silica with a trialkoxysilane to make the silica more organophilic while minimizing the self condensation of the trialkoxysilane, which process comprises:
   (a) admixing water and a catalytic amount of acid with the silica organosol; and
   (b) gradually adding a trialkoxysilane to the admixture under reactive conditions; and
   (c) removing substantially all of the water;
wherein the trialkoxysilane is present at a level up to about 30% by weight based upon the weight of the silica and the water is added at an amount up to about 15% by weight based upon the weight of the water-miscible organic solvent.

2. The process of claim 1 further characterized in that the silica is a colloidal silica.

3. The process of claim 1 further characterized in that the water is removed by azeotropic distillation.

4. The process of claim 1 further characterized in that the trialkoxysilane is present at a level of up to about 20% by weight based upon the weight of the silica.

5. The process of claim 4 further characterized in that the trialkoxysilane is present at a level of from about 5 to about 12% by weight based upon the weight of the silica.

6. The process of claim 1 further characterized in that the water is present in an amount ranging from about 1 to about 10% by weight based upon the weight of the water-miscible organic solvent.

7. The process of claim 1 further characterized in that the trialkoxy silane is gradually added to the admixture of water, acid and silica organosol while the admixture is maintained at a temperature ranging from about 25° to about 140° C.

8. The process of claim 7 further characterized in that the admixture is maintained at a temperature ranging from about 90° to about 120° C.

9. A surface treated silica prepared by the process of claim 1.

* * * * *